(12) United States Patent
Go (10) Patent No.: US 6,280,102 B1
(45) Date of Patent: Aug. 28, 2001

(54) OPTICAL MODULE PRODUCT WITH SEALING CAP

(75) Inventor: Hisao Go, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/252,786

(22) Filed: Feb. 19, 1999

(30) Foreign Application Priority Data

Feb. 20, 1998 (JP) .................................................. 10-038746

(51) Int. Cl.⁷ ...................................................... G02B 6/36
(52) U.S. Cl. ................................................................ 385/94
(58) Field of Search .................................. 385/88, 92, 93, 385/94

(56) References Cited

U.S. PATENT DOCUMENTS

| | | | | |
|---|---|---|---|---|
| 5,029,968 | * | 7/1991 | Geiseer, Jr. et al. | 350/96.2 |
| 5,617,495 | | 4/1997 | Funabashi et al. | |
| 5,737,467 | * | 4/1998 | Kato et al. | 385/92 |
| 6,075,911 | * | 6/2000 | Goto | 385/31 |

FOREIGN PATENT DOCUMENTS

| | | |
|---|---|---|
| 57-76509 | 5/1982 | (JP) . |
| 2-7010 | 1/1990 | (JP) . |
| 4-63495 | 2/1992 | (JP) . |
| 4-63496 | 2/1992 | (JP) . |
| 9-61674 | 3/1997 | (JP) . |
| 9-152527 | 6/1997 | (JP) . |

* cited by examiner

*Primary Examiner*—Hung N. Ngo
(74) *Attorney, Agent, or Firm*—McDermott, Will & Emery

(57) ABSTRACT

The optical module product comprises an optical module and a sealing cap. The optical module comprises a ferrule, an optical fiber, an optical device, and an optical module assembly. The ferrule covers the side face of the optical fiber and has first and second end portions. The optical device is optically coupled with the optical fiber. The package has a surface from which one end portion of the ferrule projects, and encapsulates the optical device. The sealing cap comprises a sealing portion provided with a ferrule insertion hole having a contacting portion on the inner wall face thereof. The contacting portion comes into close contact with the side face of the ferrule to seal the projected end portion of the ferrule. In the state where the contacting portion seals the part of the ferrule including the second end portion, the sealing cap accommodates the ferrule projected from the package in the ferrule insertion hole.

7 Claims, 8 Drawing Sheets

OPTICAL MODULE PRODUCT WITH SEALING CAP

BACKGROUND OF THE INVENTION

1. Field of the Invention

The present invention relates to an optical module product.

2. Related Background Art

An optical module comprises a package, a semiconductor optical device, and a ferrule. The package includes the semiconductor optical device therewithin. The semiconductor optical device is optically coupled to one end face of an optical fiber. A part of the optical fiber is inserted into a ferrule, and the one end portion thereof is exposed at an end portion of the ferrule. A plurality of lead terminals are drawn out of a side face of the package.

This optical module is mounted to a printed circuit board or the like by soldering. Since a flux or the like is used when soldering, the soldered optical module is washed after the soldering so as to eliminate the flux residues, contamination, and the like.

SUMMARY OF THE INVENTION

Having studied the prior art, the inventor has found the following problems.

In the above-mentioned optical module, one end face of the optical fiber is exposed at the end portion of the ferrule in washing after the soldering. As a consequence, contamination and the like may attach to this end face of the optical fiber. The conventional optical module has been problematic in that cleaning is required for keeping the end face of the optical fiber from being soiled.

It is an object of the present invention to provide an optical module product, which can prevent the optical fiber end face exposed at an end portion of the ferrule from contamination when the optical module is mounted to a mounting member.

The optical module product in accordance with the present invention comprises an optical module and a sealing cap. The optical module comprises a ferrule, an optical device, and a package. The ferrule covers the side face of an optical fiber and has first and second end portions thereof. The optical device is optically coupled with the optical fiber. The package has a surface from which the ferrule projects in a state where the second end portion of the ferrule is directed outward, and encapsulates the optical device. The sealing cap comprises a sealing portion. The sealing portion has a ferrule insertion hole for accommodating the ferrule, the hole includes a contacting portion for coming into close contact with the side face of the ferrule so as to seal the second end portion of the ferrule. The ferrule projected from the package is accommodated in the ferrule insertion hole of the sealing cap, and the contacting portion comes into close contact with the ferrule, whereby a part of the ferrule including the second end portion is sealed. One end face of the optical fiber is exposed at thus projected end portion of the ferrule. As a consequence, the end portion of the ferrule including the optical fiber end face is tightly sealed within the ferrule insertion hole. The optical fiber end face exposed at the ferrule end portion can be prevented from being soiled in cleaning.

In the optical module product in accordance with the present invention, the package can have a lead terminal electrically connected to the optical device. The sealing cap can have a support portion, and a connection portion for connecting the sealing portion to the support portion.

If the support portion and the connection portion are provided so as not to cover the surface of the package equipped with the lead terminal, then it becomes easier to check the connection of the lead terminal to its corresponding electrode on the mounting member when arranging the optical module on the mounting member such that the lead terminal meets the electrode.

In the optical module product in accordance with the present invention, at least one of the support portion and connection portion can have a suction area enabling vacuum suction on a surface thereof.

When the sealing cap is provided with a suction area enabling vacuum suction on its surface, then it becomes easier to transport the optical module. The suction surface is realized by flattening the surface of at least one of the support portion and connection portion.

When a securing portion is provided opposite to the sealing portion, the sealing cap can surround the optical module with the support portion, connection portion, and securing portion. As a consequence, the sealing cap can reliably attach to the optical module. When transporting the optical module product, the optical module can be prevented from dropping out of the sealing cap. Also, the sealing cap would not cover the mounting surface of the optical module facing the mounting member. Therefore, the sealing cap would not become an obstacle when the optical module is arranged on the mounting member.

In the optical module product in accordance with the present invention, the sealing portion comprises a tubular portion having first and second end portions and extending in a predetermined direction, and a bottom face portion provided at the first end portion of the tubular portion. The ferrule insertion hole includes a space defined by the tubular portion and the bottom face portion. Such a simple structure enables the sealing cap to attain a lighter weight.

In the optical module product in accordance with the present invention, the package has a pair of surfaces extending along the direction in which the ferrule projects, while holding the ferrule therebetween. Each of the pair of surfaces has a protrusion. The sealing cap also has a pair of arms and a pair of engagement portions. The pair of engagement portions have engagement projections engaging with their corresponding protrusions formed on the pair of surfaces of the package. The pair of arms extend from the sealing portion along the pair of surfaces of the optical module assembly so as to reach the pair of engagement portions, respectively.

As the engagement portions of the sealing cap engage with the pair of protrusions of the optical module assembly respectively, the sealing cap can be prevented from dropping out of the optical module. The sealing can also be removed from the optical module. As a consequence, the optical module can be mounted on the mounting member and then can be removed from the optical module.

The sealing cap explained above is subjected to a heat treatment together with the optical module when the optical module is mounted. Therefore, the sealing cap preferably has such a heat-resistant characteristic that it can endure the temperature of heat treatment applied thereto in mounting.

BRIEF DESCRIPTION OF THE DRAWINGS

FIG. 3A is a perspective view of a sealing cap, whereas FIG. 3B is a perspective view of the optical module;

FIG. 4A is a side view of the sealing cap, whereas FIG. 4B is a side view of the optical module;

DESCRIPTION OF THE PREFERRED EMBODIMENTS

Preferred embodiments of the present invention will be explained with reference to the accompanying drawings. Parts identical to each other will be referred to with identical numerals or letters if possible, without repeating their overlapping descriptions.

Figure 1:
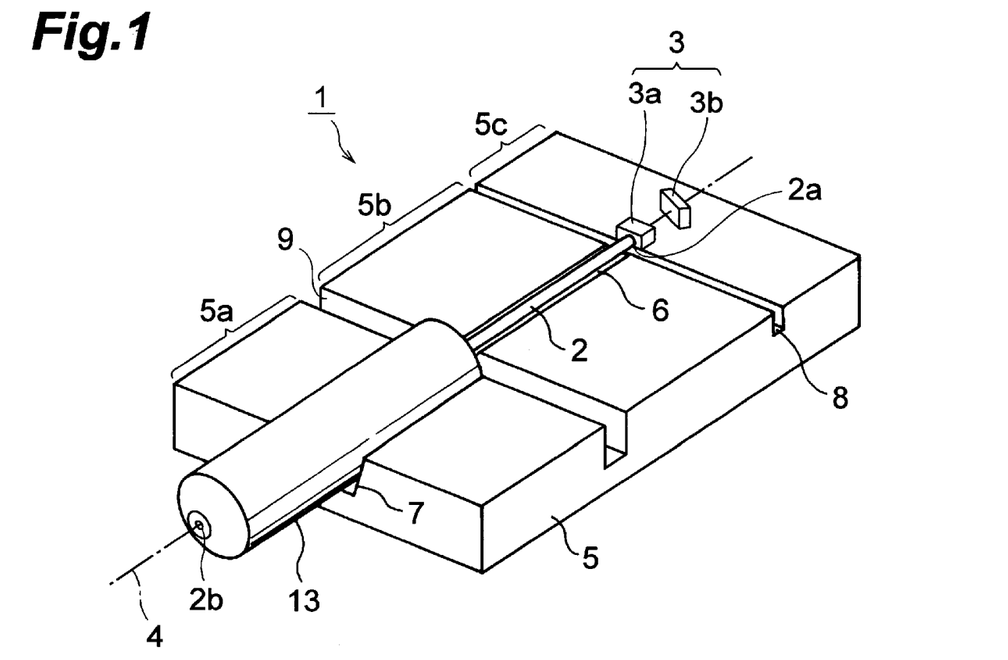
FIG. 1 is a perspective view showing a principal portion of an optical module.
Figure 2:
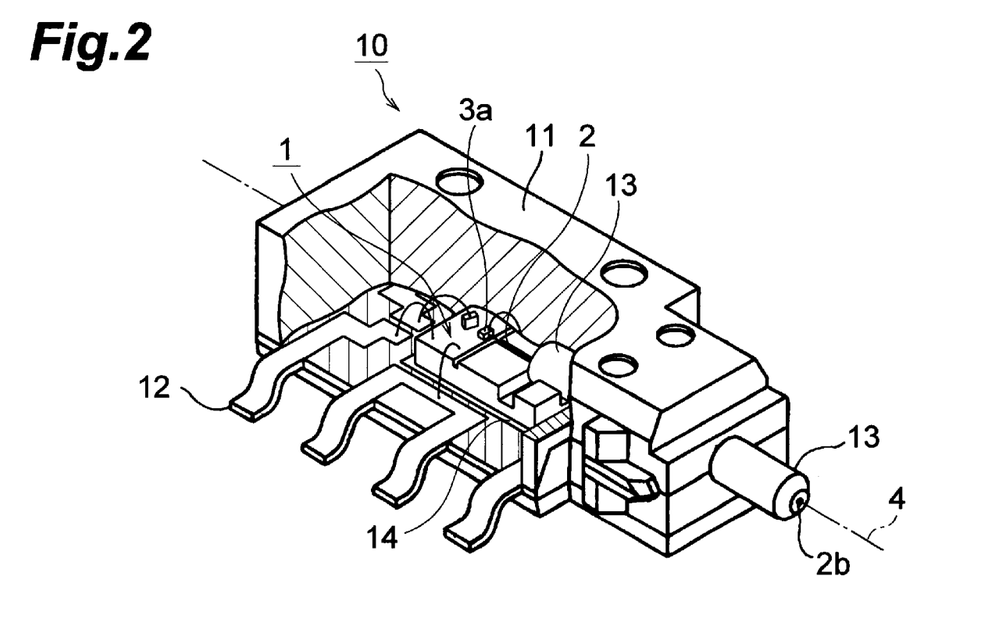
FIG. 2 is a perspective view of the optical module.

The optical module in accordance with an embodiment of the present invention will be explained with reference to FIGS. 1 and 2. FIG. 1 is a perspective view showing a principal portion 1 of the optical module. FIG. 2 is a perspective view of the optical module. FIG. 2 shows a partly cross sectional fragmentary view so as to clarify the state of the resin-encapsulated optical module principal portion.

The optical module principal portion 1 has an optical fiber 2, an optical device 3, a substrate 5, and a ferrule 13. The optical fiber 2 has a first end portion 2a and a second end portion 2b. The ferrule 13 covers the side face of the optical fiber 2 and has a pair of end portions. The second end portion 2b of the optical fiber 2 appears at one end portion of the ferrule 13. The substrate 5 comprises an optical fiber support groove 6 and a ferrule support groove 7 that extend along a predetermined axis 4. The ferrule support groove 7 is formed in a first region 5a on the substrate 5. The optical fiber support groove 6 is formed in a second region 5b on the substrate 5. In the state where the optical fiber 2 is secured to the ferrule 13, the latter is placed in the ferrule support groove 7, whereas the former is placed in the optical fiber support groove 6. The optical fiber 2 extends from the other end portion of the ferrule 13. The optical device 3 is mounted on a third region 5c on the substrate 5 so as to be optically coupled with the first end portion 2a of the optical fiber 2. The optical device 3 can be preferably a semiconductor optical device, and can be any of semiconductor light-emitting devices such as laser diode and semiconductor light-receiving devices such as photodiode. In the case of the semiconductor light-emitting device 3a shown in FIG. 1, a monitor light-receiving device 3b is provided for monitoring the light-emitting state for the semiconductor light-emitting device 3a. The monitor light-receiving device is unnecessary when the optical device 3 is a semiconductor light-receiving device. A deep rectangular groove 9 separates the first region 5a and second region 5b of the substrate 5 from each other. A shallow rectangular groove 8 separates the second region 5b and third region 5c of the substrate 5 from each other.

Referring to FIG. 2, the optical module principal portion 1 is encapsulated within a package 11 formed from a molding resin in the state where the optical module principal portion is mounted on an island 14 of a lead frame. The package 11 has a plurality of lead terminals 12 electrically connected to the optical module principal portion 1. The ferrule 13 projects from one surface of the package 11. The ferrule 13 extends along the predetermined axis 4. The optical fiber end portion 2b appears at the end face of the ferrule 13. A part of the ferrule 13 and the optical fiber extending from the ferrule 13 are accommodated within the package 11 as shown in FIG. 2. The end face 2a of the optical fiber is optically coupled with the optical device 3a accommodated within the package 11. The optical device 3a is electrically connected to a plurality of lead terminals 12 by way of bonding wires and is connected to the outside via these lead terminals 12. The package 11 is a resin body formed with a transfer molding method.

Figures 3A, 3B:
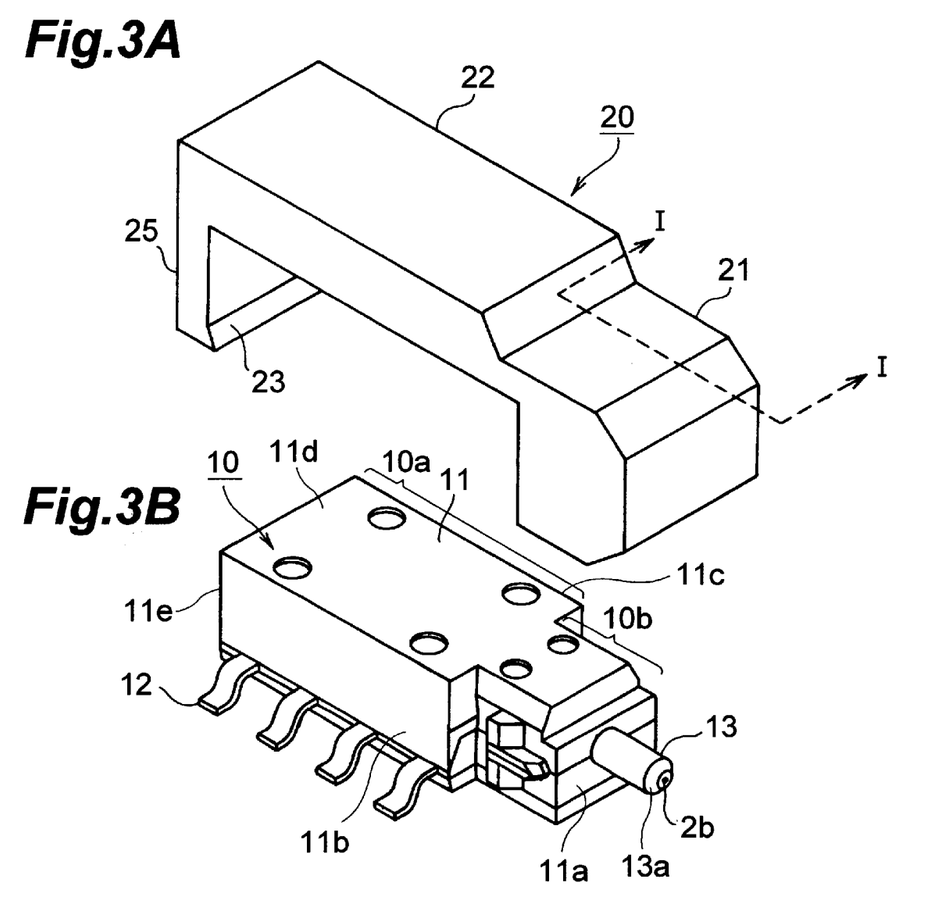
Figures 4A, 4B:
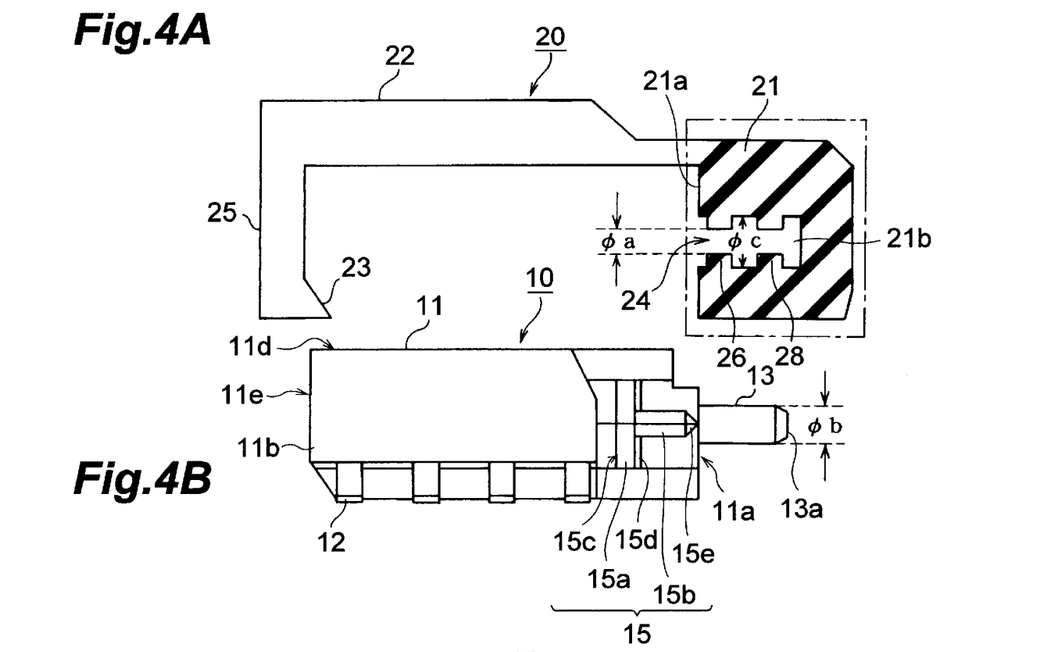

FIG. 3A is a perspective view of a sealing cap to be attached to the optical module. FIG. 3B is a perspective view of the optical module. FIG. 4A is a side view of the sealing cap to be attached to this optical module. FIG. 4B is a side view of the optical module. In FIG. 4A, the part including a ferrule insertion hole surrounded by the chain line illustrates a cross section taken along the line I—I in FIG. 3A. Similarly, in FIGS. 5 and 7, the part 21 surrounded by the chain line shows a sectional view. Thus, the cross section of the ferrule insertion hole in the sealing cap is clarified.

According to FIGS. 3A to 4B, the optical module product comprises an optical module 10 and a sealing cap 20. Although a case where the optical module 10 is molded with a mold encapsulation resin will be explained in the following, the present invention is not restricted thereto.

According to FIG. 3B, the optical module 10 comprises the package 11 assembled from assembly members, the lead terminals 12 drawn out of the package 11, and the ferrule 13. The optical module 10 has a main body portion 10a and a head portion 10b. The ferrule 13 projects from a surface 11a (hereinafter referred to as front face) of the head portion 10b.

The lead terminals 12 are provided on surfaces 11b, 11c (hereinafter referred to as lead faces) different from the front face 11a at which the ferrule 13 projects from the package 11. In the example shown in FIG. 3B, the lead terminals 12 are disposed at the lead faces 11b, 11c of the main body portion 10a (one of the side faces does not appear in the drawing). The optical module 10 has a so-called DIP (dual in-line package) structure. The lead terminals 12 are bent toward the bottom face of the package 11.

According to FIG. 4B, the diameter of the outer periphery of the ferrule 13 is φb. The ferrule 13 is shaped like a cylindrical shell with a cylindrical optical fiber insertion hole for inserting the optical fiber at the center thereof. A part of the optical fiber is inserted into this fiber insertion hole of the ferrule 13 and secured thereto. The end face 2b of the optical fiber is exposed at an end portion 13a of the ferrule 13. The ferrule 13 is embedded in the package 11 with the end portion 13a directed outward. As a consequence, the ferrule 13 projects from the front face 11a of the package 11.

According to FIGS. 3A and 4A, the sealing cap 20 comprises a sealing portion 21 having a ferrule insertion hole 24. One end portion of the ferrule 13 is inserted into the ferrule insertion hole 24. The inner wall of the ferrule insertion hole 24 is provided with contacting portions 26, 28. When the ferrule 13 is inserted to the ferrule insertion hole, the contacting portions 26, 28 come into close contact around the side face of the ferrule 13, thereby sealing a part of the ferrule 13 including the projected end portion thereof (the end portion at which the end face 2b of the optical fiber is exposed). The contacting portions 26, 28 are protrusions, formed on the inner wall face, extending so as to surround the side face of the ferrule 13.

At the positions of the contacting portions 26, 28, the cross section of the insertion hole 24 is smaller than that of the ferrule 13. For example, letting the inside diameter of the ferrule insertion hole 24 be φc, the diameter of the cross section of the ferrule 13 be φb, and the diameter of the cross section of the insertion hole 24 at each of the positions of contacting portions 26, 28 be φa; then φb>φa, and φc>φb. As a consequence, when the ferrule 13 is inserted into the insertion hole 24, the contacting portions 26, 28 can reliably come into absolute contact with the ferrule 13 throughout its outer periphery. Providing a plurality of the contacting portions 26, 28 can enhance the close contact with the ferrule. As a result, the sealing property can be enhanced.

Figure 5:
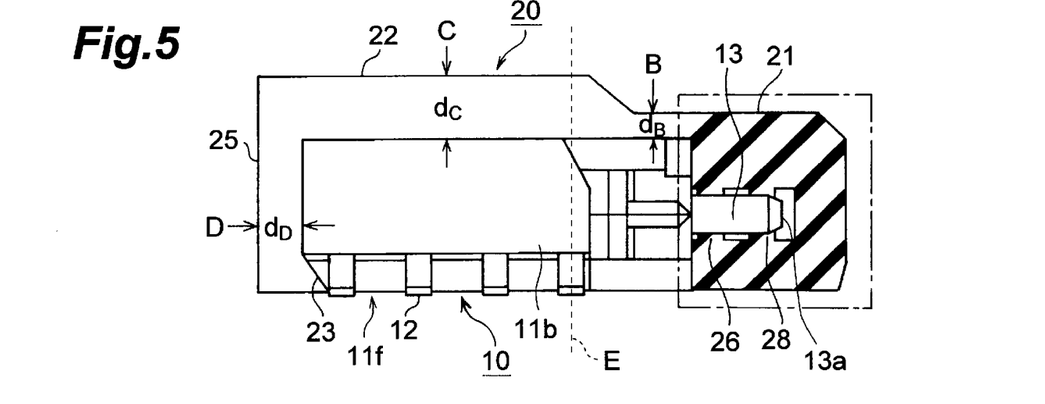
FIG. 5 is a side view of an optical module product.

FIG. 5 is a side view showing the sealing cap 20 attached to the optical module 10. As with FIG. 4A, the part surrounded with the chain line illustrates the cross section in the sealing portion 21. According to FIG. 5, when the ferrule 13 is inserted into the insertion hole 24, the cross-sectional form of the insertion hole 24 at each of the positions of contacting portions 26, 28 expands in conformity to the outside shape of the ferrule 13, whereas the contacting portions 26, 28 elastically shrink. Hence, the ferrule 13 is accommodated within the ferrule insertion hole 24, and the contacting portions 26, 28 on the inner wall of the insertion hole 24 come into close contact with the periphery of side face of the ferrule 13. As a result, the part of ferrule 13 including the end portion 13a is sealed. The sealing cap 20 would not damage the side face of the ferrule 13. In this embodiment, it is preferred that φa is designed so as to become about 80% to about 95% of φb. When such a value is attained, then the sealing property of the ferrule 13 inserted in the ferrule insertion hole 24 can be enhanced, and the operation for attaching/detaching the sealing cap 20 to/from the optical module assembly can be carried out favorably.

Also, according to FIGS. 4A and 5, the sealing cap 20 has a connection portion 22 and a support portion 25. The support portion 25 is provided so as to face the surface 11e (hereinafter referred to as back face) opposed to the front face 11a. The connection portion 22 connects the sealing portion 21 and the support portion 25 to each other. When the sealing cap 20 is provided with the connection portion 22 and the support portion 25, then the mechanical strength of the sealing cap 20 enhances. In the sealing cap 20, the optical module 10 is held between the sealing portion 21 and the support portion 25. In the sealing cap 20, the sealing portion 21 and the support portion 25 are also connected to each other by the connection portion 22 such that these three portions can form a single member. As a consequence, the attachability to the optical module 10 is further improved.

As shown in FIGS. 3A and 4A, the sealing cap 20 can also have a suction area in which at least a part of the outer surface of the connection portion 22 is made flat. The flat portion of the surface of the sealing cap 20 is available for a suction surface for vacuum suction. For example, this suction surface can be used for transporting the optical module 10 onto a printed circuit board in soldering. If the suction surface is thus provided, then vacuum suction can be carried out on this flat portion when the optical module product 10, 20 is transported. Although the surface of the connection portion 22 is made flat in this embodiment, the surface of the support portion 25 can be made flat as well.

Figure 6:
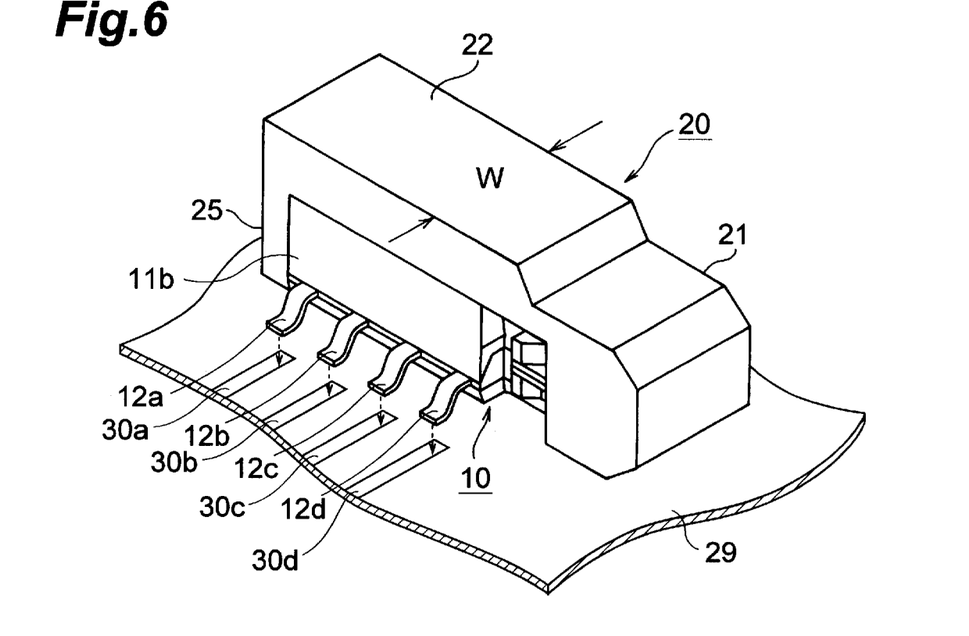
FIG. 6 is a perspective view of the optical module product.

FIG. 6 is a perspective view of the sealing cap 20 attached to the optical module 10. FIG. 6 also shows the optical module product being disposed on a mounting member 29. Referring to FIG. 6, the connection portion 22 and support portion 25 of the sealing cap 20 are formed so as not to cover the lead faces 11b, 11c. As a consequence, when arranging the optical module product 10, 20 in alignment with its corresponding electrodes 30a to 30d on the mounting member 29, the contact and connection of the lead terminals 12a to 12d with their corresponding electrodes 30a to 30d can easily be monitored. For example, it becomes easier to observe the soldering connection after soldering. Also, if the width w shown in FIG. 6 is appropriately set, then the observation becomes further easier. For example, this width w is preferably set so as to be identical to or slightly smaller than the distance between the two lead faces 11b, 11c. This configuration enables the soldering connection of the lead terminals 12 to be easily seen from above as well.

According to FIGS. 4A and 5, the sealing cap 20 can comprise a securing portion 23. The securing portion 23 extends from the support portion 25 along the surface of the optical module 10 toward an edge of the bottom face 11f opposed to the upper face 11d of the optical module 10. If the securing portion 23 is allowed to extend to the edge portion of the bottom face 11f, then the optical module 10 can be prevented from dropping out of the sealing cap 20 even when the optical module product 10, 20 is transported by vacume suction. The securing portion 23 does not traverse the plane including the bottom face 11f of the optical module 10. As a consequence, when the optical module 10 is placed on the mounting substrate (29 in FIG. 6), then a uniform gap is provided between the bottom face 11f and the mounting surface of the mounting substrate (29 in FIG. 6).

Preferably, the material for forming the sealing cap 20 is determined in view of the temperature applied thereto in mounting. This material preferably is heat resistant to the temperature applied thereto in a step accompanied with a temperature rise such as soldering after the sealing cap 20 is attached to the optical module 10. Silicone rubber is preferable as such a material.

The position of the center of gravity of the optical module product 10, 20 differs from that of the optical module 10 alone. Preferably, the sealing portion 21, the connection portion 22, and the support portion 25 are provided such that the distance between the position of the center of gravity of the optical module product 10, 20 and that of the optical module 10 alone is reduced. In the sealing cap 20, at least one of the sealing portion 21, connection portion 22, and support portion 25 can be provided with a balancing portion for adjusting the mass distribution of the sealing cap 20. When the balancing portion is provided so as to reduce the difference between the position of the center of gravity of the optical module product 10, 20 and that of the optical module 10 alone, then the shift of the center of gravity becomes smaller in the axial direction along which the ferrule 13 extends. As a consequence, the optical module product 10, 20 can be prevented from inclining in the ferrule projecting direction when the optical module product 10, 20 is arranged. Hence, the lead terminals 12 can reliably be brought into contact with their corresponding electrodes (30a to 30d in FIG. 6) on the mounting substrate (29 in FIG. 6).

The balancing portion can be formed by increasing the thickness of at least one of the connection portion 22 and support portion 25. With reference to FIG. 5, by way of example, the thickness is $d_B$ at the position B in the root of the connection portion 22 extending from the sealing portion 21, $d_C$ at the position C apart from the sealing portion 21, and $d_D$ at the position D of the support portion 25 apart from the sealing portion 21. The thicknesses at these three points have a relationship of $d_B<d_D<d_C$. At the positions C, D, the connection portion 22 and the support portion 25 are relatively thicker as compared with the position B. When the weight distribution is changed by thickening the connection portion 22 and the support portion 25, then the difference between the above-mentioned positions of center of gravity can be reduced by changing the outer shape of the sealing cap 20 alone. For adjusting the center of gravity, the thickness of the side face formed with the securing portion 23 can be increased. The thickness of the sealing portion 21 can be also decreased.

Preferably, the sealing cap 20 is designed such that the center of gravity of the optical module product 10, 20 is located in the region opposite to the ferrule 13 with respect to the broken line E shown in FIG. 5. The position of the broken line E in FIG. 5 is substantially at the center of the lead terminal 12 positioned closest to the ferrule among a plurality of lead terminals 12 arranged on the lead face 11$b$. The balancing portion provided by thickening the connection portion 22 functions effectively when disposed in the region opposite to the region in which the ferrule 13 exists with respect to the broken line E. In such a region, the thickness of the connection portion 22 of the sealing cap 20 is determined such that the thickness $d_C$ in the connection portion 22 at a position apart from the sealing portion 21 becomes greater than the thickness $d_B$ in the vicinity of the sealing portion 21.

Figure 7:
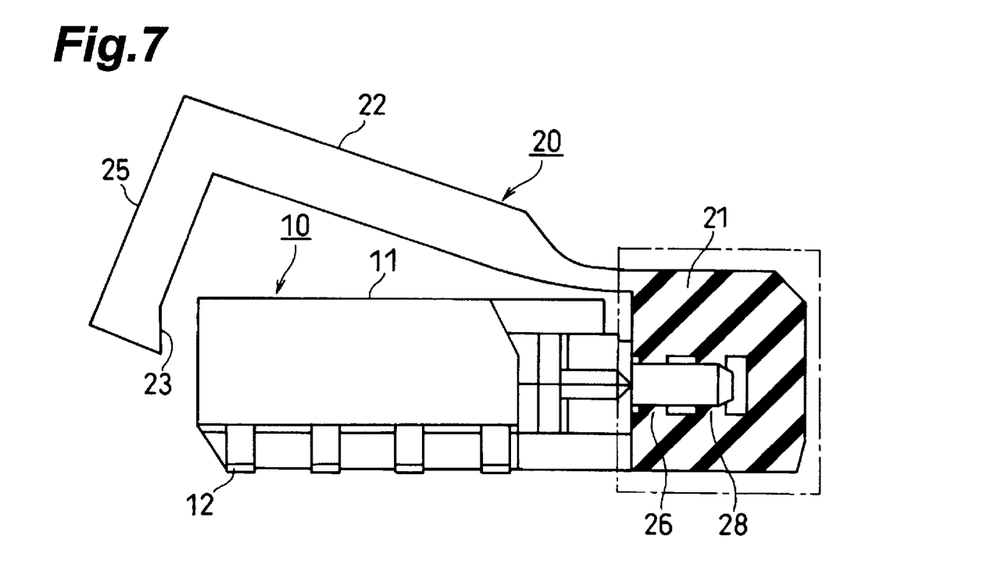
FIG. 7 is a side view of the optical module being inserted into the sealing cap.

A method of attaching the sealing cap 20 to the optical module 10 will now be explained with reference to FIGS. 4A, 4B, 5, and 7. FIG. 7 is a side view of the sealing cap 20 being attached to the optical module 10.

The optical module 10 and the sealing cap 20 are prepared as shown in FIGS. 4A and 4B. Then, as shown in FIG. 7, the upper part of the sealing cap 20 is bent at a predetermined position, and the ferrule 13 projected from the optical module 10 is inserted into the ferrule insertion hole 24 of the sealing portion 21. While restoring the bent sealing cap 20 to its original form, the sealing cap 20 is brought into contact with the upper face of the connection portion 22. Finally, as shown in FIG. 5, the securing portion 23 of the sealing cap 20 is pressed against the bottom of the back face of the assembly 11 of the optical module 10. The sealing cap 20 is thus fitted to the optical module 10 so as to complete attachment.

Figure 8:
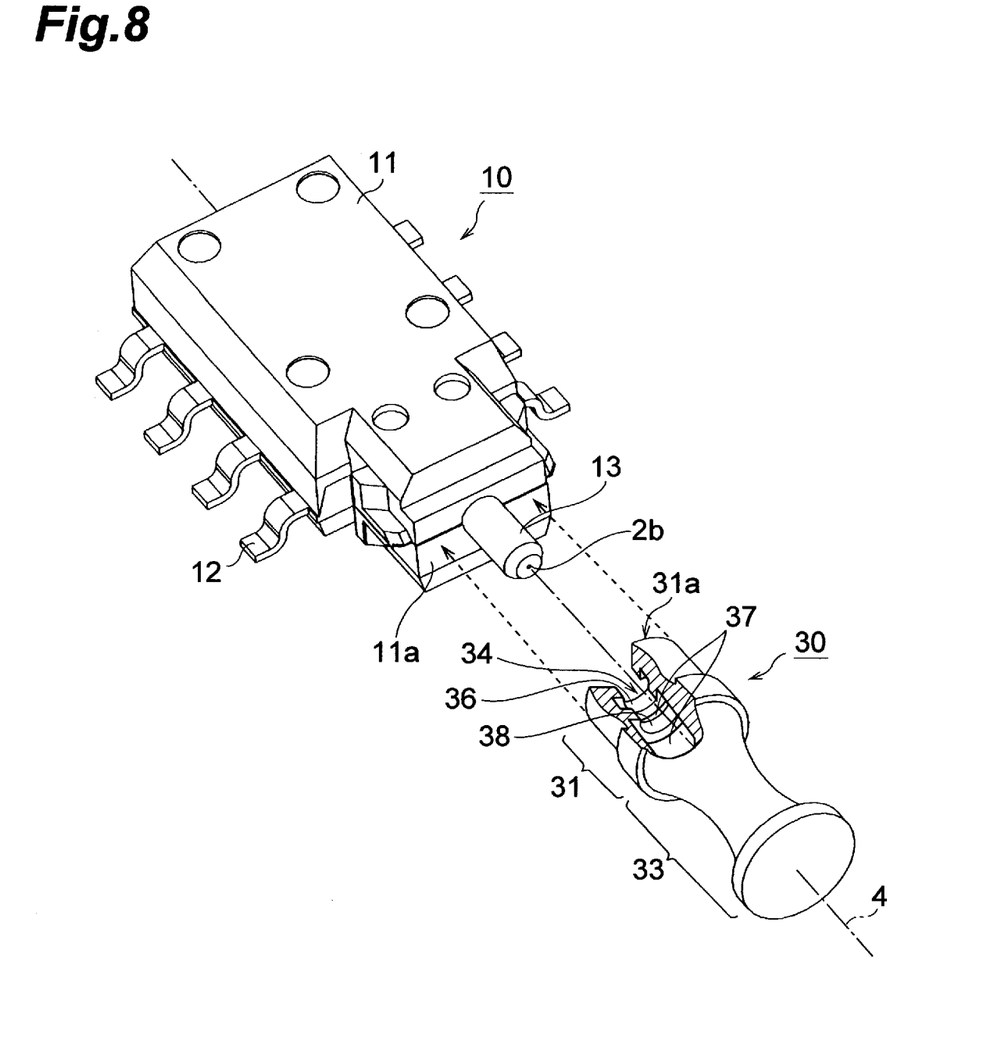
FIG. 8 is a perspective view showing a sealing cap in conjunction with an optical module.
Figure 9:
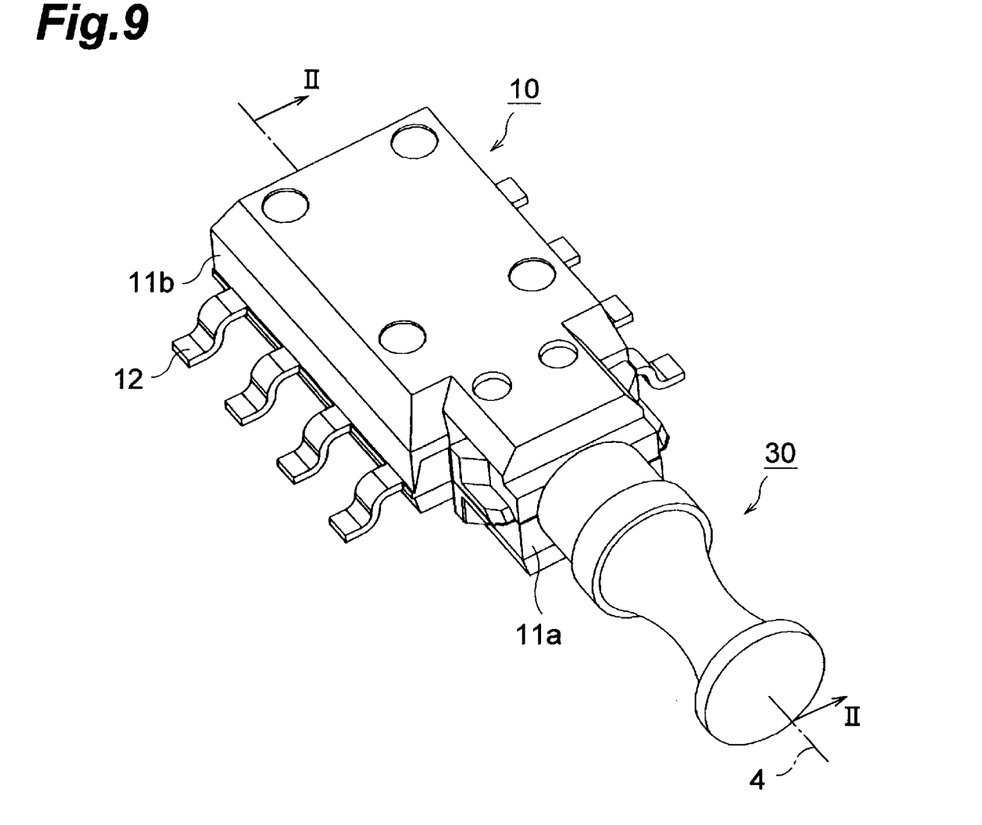
FIG. 9 is a perspective view showing the optical module product.
Figure 10:
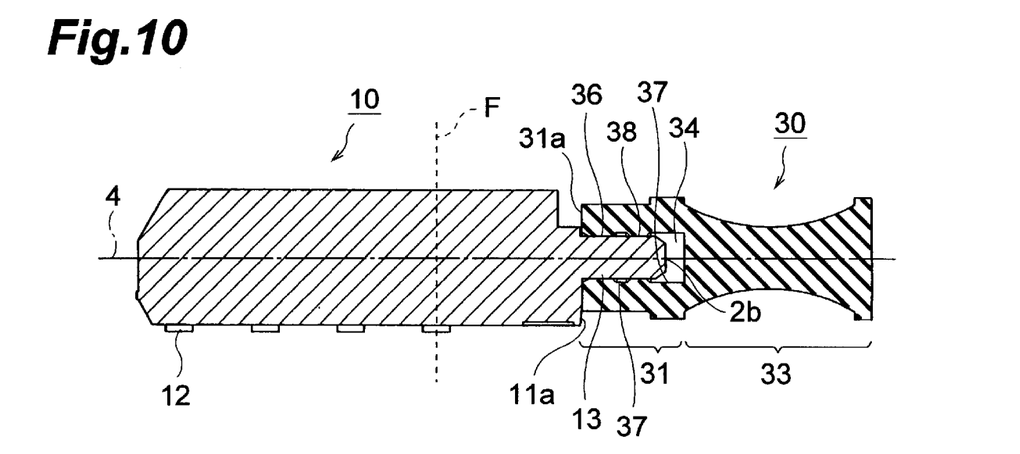
FIG. 10 is a sectional view taken along the line II—II of FIG. 9.

Referring to FIGS. 8 to 10, another embodiment of the sealing cap will be explained. FIG. 8 is a perspective view showing an optical module 10 and a sealing cap 30, and FIG. 8 is partly fragmented so as to show the inside of a ferrule insertion hole 34. FIG. 9 is a perspective view showing the optical module 10 with the sealing cap 30 attached thereto. FIG. 10 is a sectional view taken along the line II—II of FIG. 9.

Referring to FIG. 8, the sealing cap 30 comprises a sealing portion 31 and a handling portion 33. The sealing portion 31 and the handling portion 33 extend in the direction of the axis 4 along which the ferrule 13 extends. The sealing portion 31 has a ferrule insertion face 31$a$ facing the ferrule 13 projected from the optical module 10. The handling portion 33 is provided adjacent to the sealing portion 31.

Referring to the portion of ferrule insertion hole 34 shown in FIG. 8, the ferrule insertion hole 34 has an inner wall face 37 whose cross section has an inside diameter greater than the diameter of the ferrule 13, and extends along the axis 4. The opening portion of the ferrule insertion hole 34 is provided with a first contacting portion 36 having an inside diameter smaller than the diameter of the ferrule. The first contacting portion 36 is a protrusion projecting from the inner wall face 37. The protrusion 36 is formed so as to surround the axis 4 on the inner wall face 37 of the ferrule insertion hole 34.

Referring to FIG. 9, the ferrule 13 is accommodated in the ferrule insertion hole 34 of the sealing cap 30.

The procedure for inserting the ferrule 13 into the ferrule insertion hole 34 will now be explained. First, an end portion of the ferrule 13 is aligned with the ferrule insertion hole 34. The sealing cap 30 is pushed along the axis 4 so as to insert the ferrule 13 into the ferrule insertion hole 34.

FIG. 10 shows the ferrule 13 fully inserted into the sealing cap 30. As a consequence, the sealing cap 30 can protect the optical fiber end portion (2$b$ in FIG. 8) exposed at the end portion of the ferrule 13 against contamination.

According to FIG. 10, the ferrule insertion hole 34 has the first contacting portion 36 and second contacting portion 38 on the inner wall face 37. These contacting portions 36, 38 correspond to the contacting portions 26, 28 shown in FIG. 4. The second contacting portion 38 has a function similar to that of the first contacting portion 36. For this purpose, the second contacting portion 38 is preferably a closed projection formed on the inner wall face 37. Hence, when the ferrule 13 is inserted into the ferrule insertion hole 34, then the contacting portions 36, 38 come into close contact with the side face of the ferrule 13 therearound. As a consequence, the end face 2$b$ of the optical fiber appearing at the end face of the ferrule 13 can be sealed doubly. The bottom face of the ferrule insertion hole 34 is deep enough so as not to come into contact with the end face of the ferrule 13 even when the ferrule 13 is fully inserted therein. The ferrule 13 is inserted into the sealing cap 30 until the ferrule insertion face 31$a$ comes into contact with the front face 11$a$ of the optical module 10. It prevents the optical fiber end face 2$b$ from being soiled by coming into contact with the bottom face of the ferrule insertion hole 34. The contacting portions 36, 38 are also compressed in contact with the side face of the ferrule 13. Hence, the contacting portions 36, 38 generate counter forces directed to the side face of the ferrule 13. Consequently, the contacting portions 36, 38 prevent the sealing cap 30 from dropping out of the optical module 10.

As explained above, the sealing portion 31 is provided with the ferrule insertion hole 34 for accommodating the ferrule 13. The sealing portion 31 does not always have a size necessary for manual or mechanical handling when the ferrule 13 of the optical module 10 is inserted into the sealing cap. In order to compensate the size, the sealing cap 30 is provided with the handling portion 33 disposed adjacent to the sealing portion 31 as shown in FIGS. 8 and 10. The handling portion 33 extends along the direction of the axis 4 in which the ferrule 13 projects. The dimensions of the handling portion 33 are determined so as to yield a size and form sufficient for handling the sealing cap 30 manually or mechanically. Providing the handling portion 33 makes it easier to attach/detach the sealing cap 30 to/from the optical module 10.

According to FIG. 10, the ferrule 13 projects in front of the optical module 10. For protecting the ferrule 13, the sealing cap 30 is attached thereto. As a consequence, the center of gravity of the whole assembly shifts forward as the sealing cap 30 is attached thereto. For minimizing this shift, the sealing cap 30 should have a lighter weight. In practice, it is preferred that such weight reduction be carried out such that the position of the center of gravity of the optical module product 10, 30 would not shift beyond the broken line F shown in FIG. 10 toward the front side of the optical module 10.

The dimensions of the handling portion 33 should be determined so as to minimize its volume as long as the easy handling is ensured. The purpose of doing so is to sufficiently minimize the shift of the center of gravity when the sealing cap 30 is attached to the optical module 10. This is realized when the cross-sectional area of the handling portion 33 is made smaller than that of the outer shape of the sealing portion 31. As a consequence, the volume of the handling portion 33 is reduced. Hence, the center of gravity of the optical module product 10, 30 can be prevented from shifting beyond the broken line F of FIG. 10 toward the direction in which the ferrule 13 extends.

As shown in FIGS. 8 to 10, the sealing cap 30 covers only the ferrule 13 in front of the optical module 10, without covering the lead faces 11b, 11c and the upper face 11d at all. Consequently, the soldering connection of the lead terminals 12 can be observed fully. When transporting the optical module 10, the surface thereof can be subjected to vacuum suction.

Figure 11:
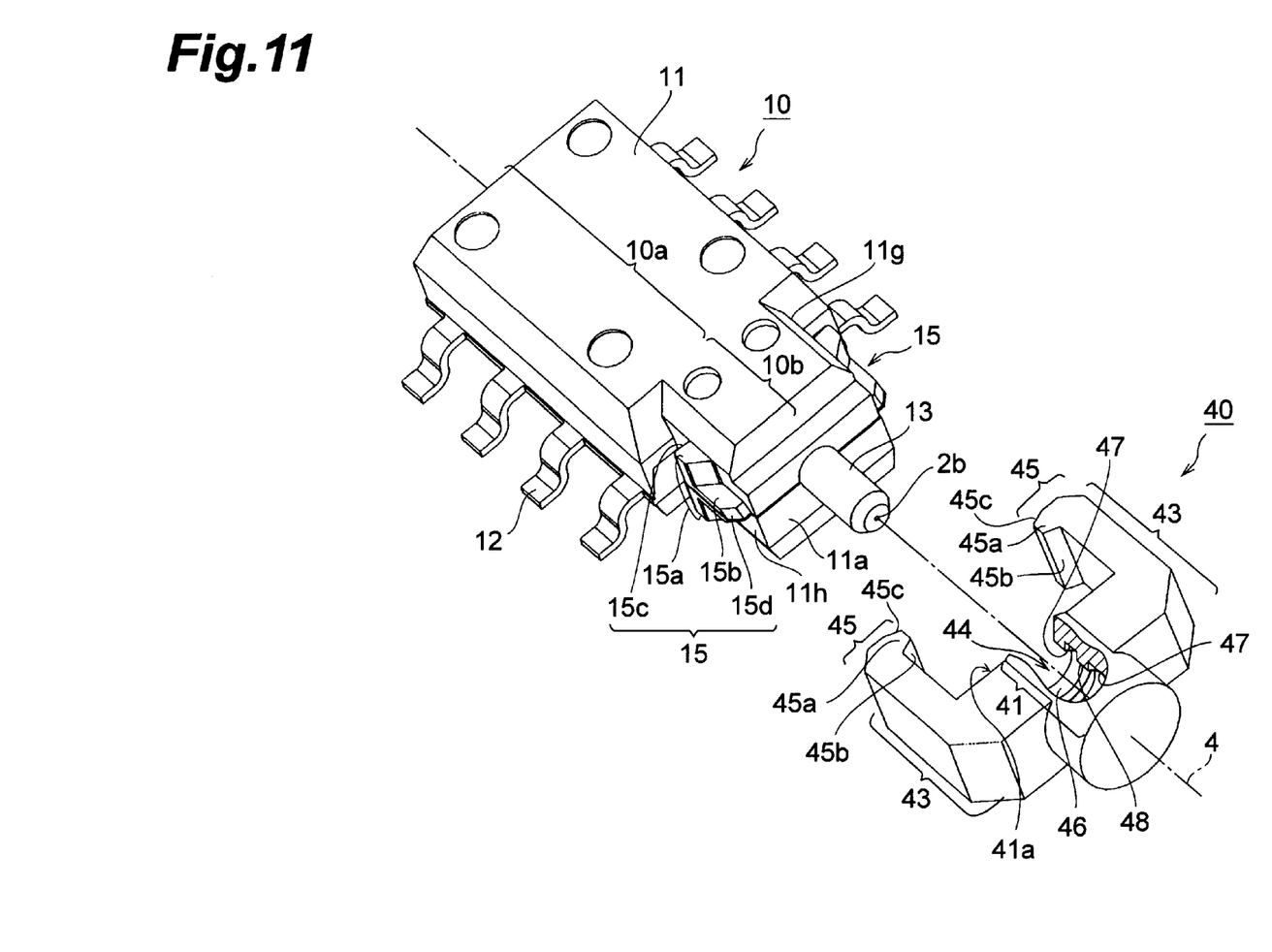
FIG. 11 is a perspective view showing a sealing cap in conjunction with the optical module.
Figure 12:
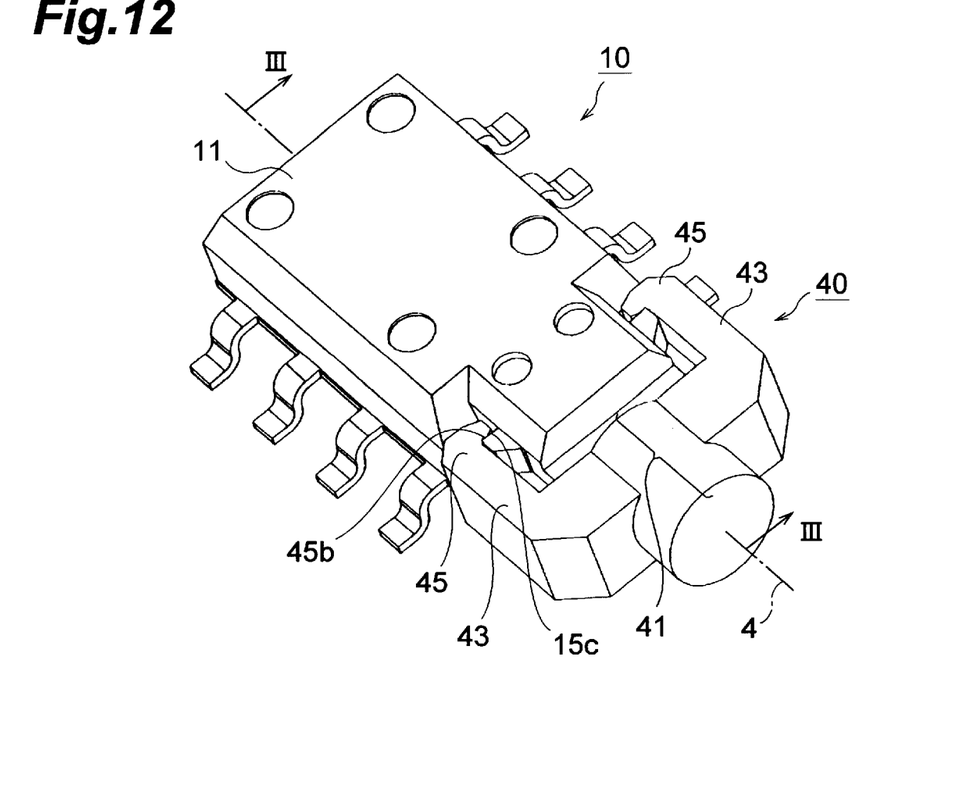
FIG. 12 is a perspective view showing the optical module product.
Figure 13:
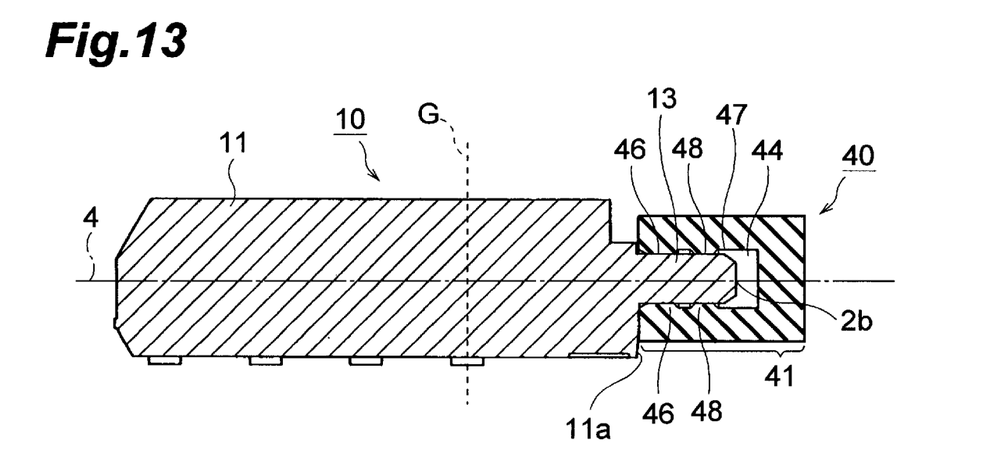
FIG. 13 is a sectional view taken along the line III—III of FIG. 12.

Another embodiment of the sealing cap will be explained with reference to FIGS. 11 to 13. FIG. 11 is a perspective view showing an optical module 10 and a sealing cap 40, and FIG. 11 is partly fragmented so as to show the inside of a ferrule insertion hole. FIG. 12 is a perspective view showing the optical module with the sealing cap attached thereto. FIG. 13 is a sectional view taken along the line III—III of FIG. 12.

Referring to FIG. 11, the sealing cap 40 comprises a sealing portion 41, a pair of arms 43, and a pair of engagement portions 45. The pair of arms 43 extend from their respective positions on the opposed side faces of the sealing portion 41 so as to reach their corresponding engagement portions 45. Each of the pair of engagement portions 45 has an engagement projection 45a. The engagement projection 45a extends inward from each of the pair of arms 43. The engagement projection 45a also has a contact face 45b provided so as to face a ferrule insertion face 41a. Further, the engagement projection 45a has a tapered face 45c, sloped toward the axis 4, extending outward. When the tapered faces 45c abut to surfaces of the package 11 while the sealing cap 40 is attached to the optical module, then they receives forces applied from the package 11 in the directions along which the pair of engagement portions 45 would spread out. As a consequence, it becomes easier to attach the sealing cap 40 to the optical module 10.

In the optical module 10, the head portion 10b has a pair of side faces 11g, 11h disposed so as to hold the ferrule 13 therebetween. A pair of protrusions 15 are formed on the pair of side faces 11g, 11h, respectively. Each of the pair of protrusions 15 has a first protrusion 15a extending while forming a predetermined angle with the direction in which the ferrule 13 extends, and a second protrusion 15b extending in the direction of the axis 4. Since the engagement portion 45 engages with the first protrusion 15a, the predetermined angle is preferably set to the right angle. The contact face 15c of the first protrusion 15a faces the contact face 45b of the engagement projection 45a when the protrusion 15 engages the engagement portion 45. As this contact face 15c comes into contact with the contact face 45b of the engagement projection 45a, the sealing cap 40 can be prevented from dropping out of the optical module 10. When the engagement portions 45 of the sealing cap 40 are engaged with their corresponding protrusions 15 of the optical module 10, the pair of arms 43 bend such that the gap between the engagement portions 45 expands in conformity to the gap between the protrusions 15 on both side faces. Therefore, the arms have elasticity and flexibility characteristics sufficient for enabling the bending. For making it easier to bend the arms 43, the second projection 15b has a tapered face 15d directed toward the sealing cap 40. When the engagement portions 45 of the sealing cap 40 come into contact with their corresponding tapered faces 15d, the latter applies forces to the pair of engagement portions 45 in the directions provided so as to expand the gap between the engagement projections 45c. As a consequence, it becomes easier to attach the sealing cap 40 to the optical module 10.

Referring to the portion of ferrule insertion hole 44 shown in FIG. 11, the ferrule insertion hole 44 has an inner wall face 47 whose cross section has an inside diameter greater than the diameter of the ferrule 13. The opening portion of the ferrule insertion hole 44 is provided with a first contacting portion 46 having an inside diameter smaller than the diameter of the ferrule 13. The first contacting portion 46 is a protrusion disposed on the inner wall face 47 of the ferrule insertion hole 44 so as to surround the predetermined axis 4.

Referring to FIG. 12, the ferrule 13 is accommodated in the ferrule insertion hole 44 of the sealing cap 40. The sealing cap 40 protects the optical fiber end face (2b in FIG. 11) appearing at an end portion of the ferrule 13. The procedure for inserting the ferrule 13 into the ferrule insertion hole 44 will now be explained. First, the projected end portion of the ferrule 13 is aligned with the ferrule insertion hole 44. The sealing cap 40 is pushed along the axis 4 so as to insert the ferrule 13 into the ferrule insertion hole 44. In order for the engagement portions 45 to ride over their corresponding protrusions 15, it is necessary for the gap between the pair of arms 43 to expand. When the sealing cap 40 is further plunged so that the gap between the engagement portions 45 becomes larger than the distance between the protrusions 15, then the engagement portions 45 are spread out by the protrusions 15. As a consequence, the arms 43 are bent outward. When the engagement projections 45a ride over their corresponding protrusions 15, then the sealing cap 40 engages with the protrusions 15 of the optical module 10.

FIG. 13 shows the ferrule 13 inserted fully in the sealing cap 40. As in the sealing cap 30, the ferrule insertion hole 44 is deeper than the length of the ferrule 13 to be inserted therein. The first and second contacting portions 46, 48 formed on the inner wall face 47 seal the end face 2b of the optical fiber appearing at an end face of the ferrule 13.

The inner structure of the ferrule insertion hole 44 will not be explained here, since it is similar to that of the ferrule insertion hole 34 shown in FIG. 10.

In the sealing cap 40, both of the arms 43 and engagement portions 45 are provided on the opposite side of the sealing portion 41 with respect to the ferrule insertion face 41a. As a consequence, the shift of center of gravity as mentioned above is smaller than that in the sealing cap 30 shown in FIG. 11. The easiness in handling of the sealing cap 40 is ensured by the pair of arms extending from the sealing portion 41.

For a reason similar to that in the case of the sealing cap 20, silicone rubber is preferable as material for the sealing caps 30, 40 as well.

In practice, it is preferred that the center of gravity of the sealing cap 40 be adjusted such that the position of the center of gravity of the optical module product 10, 40 would not shift beyond the broken line G shown in FIG. 13 toward the front side of the optical module 10.

Since the sealing cap 40 shown in FIGS. 11 to 13 covers the ferrule 13 in front of the optical module 10, the soldering connection of lead terminals 12 can be fully observed as in the case of the sealing cap 30. Here, when transporting the optical module 10, the surface of the optical module 10 can be subjected to vacuum suction.

As explained in detail in the foregoing, in the optical module product, as the sealing cap 20, 30, 40 provided with the insertion hole 24, 34, 44 for accommodating an end portion of the ferrule 13 is attached to the optical module 10, the end face of the ferrule 13 can be prevented from contamination upon washing. Therefore, the step of cleaning the end face can be eliminated. Also, in the optical module product, since the sealing cap 20, 30, 40 is not provided at the side face of the optical module 10 where the lead terminals 12 are formed, the state of connection of the lead terminals 12 can easily be observed.

As explained in detail in the foregoing, since the sealing cap is attached as a sealing device to the optical module, the present invention can provide the optical module having a sealing cap which can prevent the optical fiber end face exposed at the ferrule end face from contamination when the optical module is mounted to a mounting member.

What is claimed is:

1. An optical module product comprising:

an optical module comprising a ferrule which covers a side face of an optical fiber and has first and second end portions, said optical module encapsulating a portion of said ferrule including said second end portion such that a portion of said ferrule including said first end portion is projected therefrom; and a sealing cap comprising a sealing portion, said sealing portion being provided with a ferrule insertion hole having a contacting portion which comes into contact with a side face of said ferrule to seal said first end portion of said ferrule, said ferrule being inserted in said ferrule insertion hole.

2. An optical module product according to claim 1, wherein said sealing cap has a support portion facing a surface of said optical module opposed to a surface thereof from which said ferrule projects; and a connection portion connecting said sealing portion with said support portion.

3. An optical module product according to claim 2, wherein at least one of said support portion and connection portion has a suction area enabling vacuum suction on a surface thereof.

4. An optical module product according to claim 2, wherein at least one of said sealing portion, support portion, and connection portion is provided so as to reduce the distance between a center of gravity of said optical module with said sealing cap attached thereto and a center of gravity of said optical module.

5. An optical module product according to claim 1, wherein said sealing portion comprises a tubular portion having first and second end portions and extending in a predetermined direction, a bottom face portion provided at said first end portion of said tubular portion, and an opening provided at said second end portion of said tubular portion; said ferrule insertion hole including a space defined by said tubular portion, said bottom face portion, and said opening.

6. An optical module product according to claim 1, wherein said optical module comprises a pair of surfaces extending while holding said ferrule therebetween, said pair of surfaces having a pair of protrusions, respectively;

said sealing cap comprises a pair of arms, and a pair of engagement portions extending from said pair of arms, respectively;

said pair of arms reach said pair of engagement portions from said sealing portion along said pair of surfaces, respectively; and said pair of engagement portions have engagement projections engaging with said protrusions formed on said pair of surfaces of said optical module.

7. An optical module product according to claim 1, wherein material of said sealing cap includes silicone rubber.

\* \* \* \* \*